United States Patent Office 3,326,922
Patented June 20, 1967

3,326,922
ISOMERIZATION OF BENZO(a)QUINOLIZINE DERIVATIVES
Harry Tacon Openshaw and Norman Whittaker, London, England, assignors to Burroughs Wellcome & Co. (U.S.A.) Inc., Tuckahoe, N.Y., a corporation of New York
No Drawing. Filed Mar. 17, 1965, Ser. No. 440,609
Claims priority, application Great Britain, Mar. 20, 1964, 11,809/64
10 Claims. (Cl. 260—287)

This invention relates to the isomerisation of unsaturated compounds and in particular to the isomerisation of benzo(a)quinolizine derivatives.

The preparation of substituted 1,4,6,7-tetrahydro-benzo-(a)quinolizines is an important step in the synthesis of the amoebicide (—)-2-dehydro-emetine (I), racemic 2-dehydro-emetine or homologues thereof. An improved method has now been found to provide racemic or optically active substituted 2-alkoxycarbonylmethyl-1,4,6,7-tetrahydro-11bH-benzo(a)quinolizines of Formula II by isomerising the corresponding 2-alkoxycarbonylmethylene-1,2,3,4,6,7-hexahydro-11bH-benzo(a)quinolizines of Formula III with a strong anhydrous base. Such bases include the alkoxide anion or the methylsulphinyl carbanion. For example, alkali or quaternary ammonium methoxide, ethoxide or tertiary butoxide may satisfactorily be used. If the product is to be isolated, it is preferred to use an alkoxide corresponding to the ester group of the compound, otherwise an interchange of alkoxy groups may take place, producing a mixture of esters. The same applies if an alcohol is used as a medium.

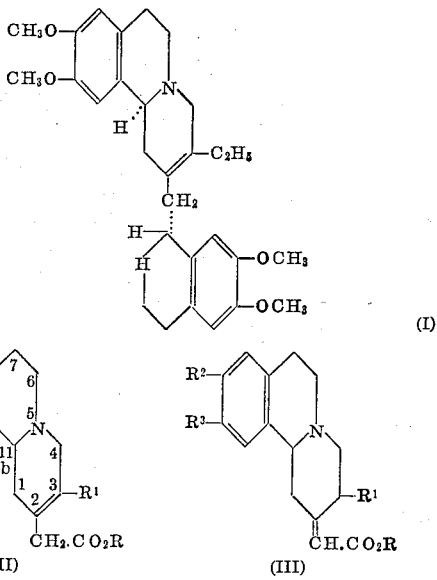

In these and subsequent formulae R is an alkyl group, $R^1$ is a lower alkyl group, and $R^2$ and $R^3$ are the same or different and each is a lower alkoxy group or $R^2$ and $R^3$ together form a methylenedioxy group. The term lower alkyl or lower alkoxy is denoted to indicate from 1 to 4 carbon atoms.

Racemic or optically active 2-alkoxycarbonylmethylene-3-ethyl-1,2,3,4,6,7-hexahydro - 9,10 - dimethoxy - 11bH-benzo(a)quinolizines can, for instance, conveniently be made by the method described in the specification of the co-pending British patent application 39,934/59 corresponding to U.S. Patent No. 3,123,609, which comprises a condensation of the corresponding 2-oxo-benzo(a)quinolizine with a alkoxycarbonylmethylene-triarylphosphorane, or by a condensation of the same ketone with a phosphonate according to the method described in the Journal of the Chemical Society, 1963, on page 1462.

Any of the known stereoisomers of the ester (III), or a mixture of such isomers arising from the above condensation with a phosphonate, may be used in the process according to the present invention, giving rise in each case to a product of the Formula II. For example, when the optically active forms of the 3-ethyl-9,10-dimethoxy derivatives, having a configuration shown in Formula IV or V, are employed in the process as starting materials, no racemisation occurs and the (—)-enantiomer of the compound of formula (II; $R^1$=Et, $R^2$=$R^3$=MeO), is obtained, suitable for conversion into (—)-2-dehydro-O-methylpsychotrine or (—)-2-dehydro-emetine.

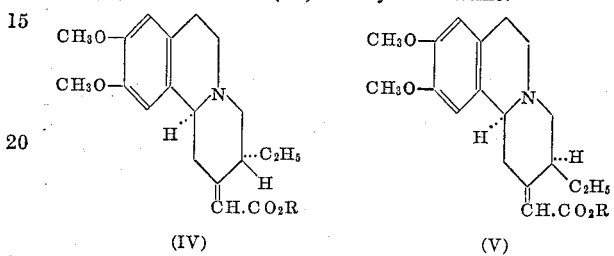

The racemic or (—)-form of the ester of formula (II; $R^1$=Et, $R^2$=$R^3$=MeO) may be converted into racemic or optically active (—)-2-dehydro-emetine by the methods described in the specifications of co-pending application No. 11,808/64 of even date herewith (corresponding to U.S. patent application Ser. No. 440,635, filed Mar. 17, 1965) or British Patent No. 798,847 (corresponding to U.S. Patent No. 2,877,226), or in the specification of South African patent application No. 62/987 (corresponding to French Patent No. 1,351,814).

The method of the present invention may conveniently be carried out in a medium, which contains a non-aqueous polar solvent, not incompatible with the reactants. Lower alcohols, in conjunction with a corresponding alkoxide as a base, have been used advantageously and are preferred. Similarly, dimethyl sulphoxide may conveniently be used with an alkoxide or the methylsulphinyl carbanion as a base.

According to the present invention, therefore, there is provided a method for the production of a substituted 2-alkoxycarbonylmethyl-1,4,6,7-tetrahydro-11bH - benzo(a)quinolizine of Formula II, comprising the step of treating a 2-alkoxycarbonylmethylene-1,2,3,4,6,7-hexahydro-11bH-benzo(a)quinolizine of Formula III with a strong anhydrous base. In a particular aspect there is provided a method for the production of a (—)-2-alkoxycarbonyl-methyl-3-ethyl-1,4,6,7-tetrahydro-9,10-dimethoxy - 11bH-benzo(a)quinolizine, in which any of the appropriate enantiomers of Formulae IV and V is treated with a strong anhydrous base. In a further aspect there is provided a method for the production of racemic or optically active (—)-2-dehydro-O-methylpsychotrine and racemic or optically active (—)-2-dehydro-emetine.

The following examples illustrate the invention.

*Example 1*

A solution of sodium (0.8 g.) in anhydrous ethanol (16 ml.) was refluxed with ethyl phthalate (1.8 ml.) for 10 minutes (to destroy traces of water) and the resulting anhydrous alkoxide solution was refluxed with (+)-2-ethoxycarbonylmethylene-3-ethyl-1,2,3,4,6,7-hexahydro-9,10 - dimethoxy-11bH-benzo(a)quinolizine (IV, R=Et) (2.0 g.), under nitrogen, for 1¼ hours. The alcohol was evaporated in vacuo, the ice-cooled residue was shaken with ice-cold water (125 ml.) and benzene (75 ml.), and the benzene solution was separated, washed free from alkali with water, and extracted with 0.1 N hydrochloric acid (80 ml.). The extract was washed with benzene, basified with potassium hydroxide, and extracted with diethyl ether (2×75 ml.), and the ethereal solution of the product was washed with water, dried over anhydrous sodium sulphate, and evaporated. The residual pale yellow gum was warmed in vacuo to remove traces of ether, yielding 1.84 g., $[\alpha]_D^{25}$ −218° (c.=2 in EtOH) of (−)-2-ethoxycarbonylmethyl-3-ethyl-1,4,6,7-tetrahydro-9,10 - dimethoxy-11bH-benzo(a)quinolizine.

Example 2

A mixture of (−)-2-ethoxycarbonylmethyl-3-ethyl-1,4,6,7 - tetrahydro - 9,10 - dimethoxy-11bH-benzo(a)quinolizine (1.60 g.), homoveratrylamine (1.99 g.) and 2-hydroxypyridine (0.33 g.) was heated, under nitrogen in a bath at 165° C. for 5 hours. The cooled gum was seeded and stirred with water (20 ml.) and diethylether (10 ml.), and the resulting suspension of colourless needles was set aside overnight and filtered, giving 1.685 g. (77%), M.P. 157–159° C., $[\alpha]_D^{25}$ −185° (c.=1 in MeOH), of (−)-3-ethyl-1,4,6,7 - tetrahydro - 9,10 - dimethoxy-11bH-benzo(a)quinolizine-2-acetic acid homoveratrylamide.

This compound was then cyclised in benzene with phosphorus oxychloride into (−)-2-dehydro-O-methylpsychotrine and the product reduced to produce (−)-2-dehydro-emetine, according to the method described in South African patent application No. 62/987.

Example 3

Racemic 2-methoxycarbonylmethylene-3-ethyl - 1,2,3,4,6,7 - hexahydro - 9,10 - dimethoxy-11bH-benzo(a)quinolizine of formula (V; R=Me), M.P. 116–117° C. (2.5 g.) was treated with alcoholic sodium ethoxide [prepared from sodium (0.5 g.), anhydrous ethanol (8 ml.) and ethyl phthalate (0.9 ml.) as described in Example 1.], and the mixture was refluxed under nitrogen for 2 hours. The reaction product was isolated by the method used in Example 1, yielding racemic 2-ethoxycarbonyl-methyl-3-ethyl-1,4,6,7 - tetrahydro - 9,10-dimethoxy-11bH-benzo (a)-quinolizine (II; R=R¹=Et, R²=R³=NeO) (1.95 g.) as a pale yellow gum.

Example 4

Reaction of racemic 2-ethoxycarbonylmethyl-3-ethyl-1,4,6,7 - tetrahydro - 9,10-dimethoxy-11bH-benzo(a)quinolizine with homoveratrylamine in the presence of 2-hydroxypyridine, in the manner described for the (−)-enantiomer in Example 2 gave the racemic 3-ethyl-1,4,6,7-tetrahydro - 9,10 - dimethoxy-11bH-benzo(a)quinolizine-2-acetic acid homoveratrylamide, M.P. 151–152° C., in a 76% yield.

This compound was then cyclised in benzene with phosphorus oxychloride into racemic 2-dehydro-O-methylpsychotrine and reduced to produce 2-dehydro-emetine, according to the method described in British Patent 798,847.

Example 5

Isomerisation of the second racemic form of 2-methoxycarbonyl - methylene - 3-ethyl-1,2,3,4,6,7-hexahydro-9,10-11bH-benzo(a)-quinolizine of formula (V; R=Me), M.P. 89–90° C., with alcoholic sodium ethoxide in the manner of Example 3, gave the same racemic ester of formula (II; R=R¹=Et, R²=R³=MeO), in a 90% yield.

Example 6

To an alcoholic solution of sodium ethoxide [prepared from sodium (1.5 g.), anhydrous ethanol (24 ml.), and ethyl phthalate (2.7 ml.)] cooled to 0° C. and stirred under nitrogen, (−)-3-ethyl-1,2,3,4,6,7-hexahydro-9,10-dimethoxy-2-oxo-11bH-benzo(a)quinolizine (5.0 g.) and diethyl methoxycarbonylmethylphosphonate (4.55 g.) were added. The mixture was allowed to come to room temperature spontaneously and the resulting solution of mixed, optically active, stereoisomeric esters of Formulae IV and V was set aside overnight. The solution was then refluxed for 2 hours and the resulting isomerisation product was isolated by the method used in Example 1, giving (−) - 2 - ethoxy-carbonylmethyl-3-ethyl-1,4,6,7-tetrahydro-9,10-dimethoxy-11bH-benzo(a)quinolizine (5.64 g.) $[\alpha]_D^{25}$ −210° (c.=2 in EtOH). The derived homoveratrylamide was identical in all respects with the homoveratrylamide described in Example 1.

Example 7

(−)-3-ethyl-1,2,3,4,6,7-hexahydro - 9,10 - dimethoxy-2-oxo-11bH-benzo(a)quinolizine (15.8 g.) was reacted with the phosphonate carbanion derived from diethyl methoxycarbonylmethylphosphonate (14.4 g.) and the product was isomerised, in the manner of Example 6. The resulting (−) - 2 - ethoxycarbonylmethyl-3-ethyl-1,4,6,7-tetrahydro - 9,10 - dimethoxy-11bH-benzo(a)quinolizine (19.4 g.) was heated with nomoveratrylamine (23.5 g.) and 2-hydroxypyridine (3.9 g.), under nitrogen, in a bath at 172° C. for 5 hours. The resulting (−)-3-ethyl-1,4,6,7-tetrahydro - 9,10 - dimethoxy-11bH-benzo(a)-quinolizine-2-acetic acid homoveratrylamide, M.P. 157–159° C., $[\alpha]_D^{25}$ −184° (c.=1 in MeOH), amounted to 20.3 g., representing a 75% overall yield from the (−)-2-oxo-benzo(a)quinolizine.

Example 8

When diethyl ethoxycarbonylmethylphosphonate was substituted for the corresponding methyl ester in the reaction described in Example 6, a similar high yield of (−)-2 - ethoxycarbonylmethyl - 3-ethyl-1,4,6,7-tetrahydro-9,10-dimethoxy-11bH-benzo(a)quinolizine was obtained.

Example 9

When the procedure of Example 3 was repeated in the presence of methanolic sodium methoxide in place of alcoholic sodium ethoxide, isomerisation again took place, yielding racemic 3-ethyl-1,4,6,7-tetrahydro-9,10-dimethoxy-methoxycarbonylmethyl - 11bH - benzo(a)quinolizine (2.2 g.) as a pale yellow gum, having the expected infrared absorption spectrum.

Example 10

Sodium hydride (0.35 g. of a 50% oil-dispersion) was freed from oil by washing several times with dry petroleum (B.P. 40–60° C.) under dry nitrogen, and traces of petroleum were evaporated from the residual solid in a current of warm dry nitrogen. Dry dimethyl sulphoxide (6.5 ml.) was added, the mixture was heated in a bath at 70–75° C. for 45 minutes and the resulting solution of "dimsylsodium" was cooled in ice-water and treated with (+) - 2 - ethoxycarbonylmethylene-3-ethyl-1,2,3,4,6,7-hexahydro - 9,10 - dimethoxy-11bH-benzo(a)quinolizine (IV; R=Et) (1.0 g.). The mixture was allowed to come to room temperature spontaneously, with stirring, and after only 5 minutes at 25° C. the resulting solution was shaken with water (40 ml.) and diethyl ether (40 ml.), with cooling. The mixture was filtered (Hyflo) and the ethereal solution of product was washed with water, dried over anhydrous sodium sulphate, and evaporated. The residual pale yellow gum was warmed in vacuo to remove traces of ether, yielding 0.52 g., $[\alpha]_D^{24}$ −227° (c.=1.87 in EtOH), of (−)-2-ethoxycarbonylmethyl-3-ethyl-1,4,6,7-tetrahydro - 9,10 - dimethoxy - 11bH - benzo(a)quinolizine, having the correct infra-red absorption spectrum.

Example 11

Racemic 1,2,3,4,6,7-hexahydro-9,10-dimethoxy-3-methyl-2-oxo-11bH-benzo(a)quinolizine (15 g.) was reacted with the phosphonate carbanion derived from diethyl ethoxycarbonylmethylphosphonate (15.3 g.) in the manner of Example 6. The derived isomerisation product, 2-ethoxy - carbonylmethyl - 1,4,6,7-tetrahydro-9,10-dimethoxy-3-methyl-11bH-benzo(a)quinolizine, was heated with homoveratrylamine (22 g.) and 2-hydroxypyridine (3.6 g.), under nitrogen, at 165–170° C. for 5 hours, yielding 1,4,6,7 - tetrahydro - 9,10 - dimethoxy-3-methyl-11bH-benzo(a)quinolizine-2-acetic acid homoveratrylamide (14.5 g.), M.P. 139–140° C.

What we claim is:

1. A method for the production of a substituted 2-alkoxycarbonyl methyl-1,4,6,7-tetrahydro-11bH-benzo(a)quinolizine of Formula II,

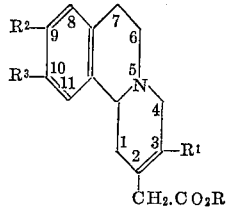

(II)

wherein R is alkyl having from 1 to 4 carbon atoms, $R^1$ is lower alkyl, and $R^2$ and $R^3$ are the same or different and each is lower alkoxy having from 1 to 4 carbon atoms or $R^2$ and $R^3$ together form methylenedioxy, comprising the step of reacting a compound of Formula III,

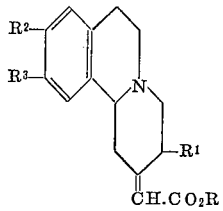

(III)

wherein R, $R^1$, $R^2$ and $R^3$ are as defined in Formula I, with a strong anhydrous base selected from the class consisting of lower alkoxide and the anion of dimethyl sulfoxide.

2. A method according to claim 1, in which the treatment is carried out in a non-aqueous polar solvent selected from the class consisting of lower alcohol and dimethyl sulfoxide.

3. A method according to claim 2, in which the solvent is lower alcohol and the base is the anion of the lower alcohol solvent selected.

4. A method according to claim 2, in which the solvent is dimethyl sulphoxide and the base is the methylsulphinyl carbanion.

5. A method for the production of a 2-alkoxycarbonylmethyl-3-ethyl-1,4,6,7-tetrahydro-9,10-dimethoxy-11bH-benzo(a)quinolizine comprising treating a 2-alkoxycarbonylmethylene-3-ethyl-1,2,3,4,6,7-hexahydro-9,10-dimethoxy-11bH-benzo(a)quinolizine with an anhydrous strong base selected from the class consisting of lower alkoxide and the anion of dimethyl sulfoxide.

6. A method for the production of (—)-2-alkoxycarbonylmethyl-3-ethyl-1,4,6,7-tetrahydro-9,10-dimethoxy-11bH-benzo(a)quinolizine in which a 2-alkoxycarbonylmethylene-3-ethyl-1,2,3,4,6,7-hexahydro-9,10-dimethoxy-11bH-benzo(a)quinolizine selected from the class consisting of the configuration of the Formulas IV and V

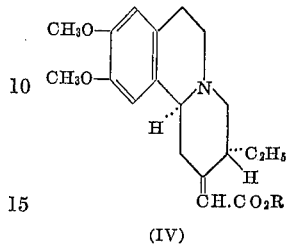 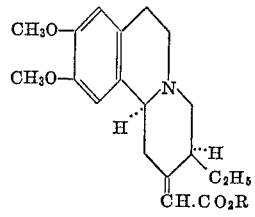

(IV) (V)

in which R is alkyl, is treated with a strong anhydrous base selected from the class consisting of lower alkoxide and the anion of dimethyl sulfoxide.

7. A method for the production of a 2-alkoxycarbonylmethyl-1,4,6,7-tetrahydro-9,10-dimethoxy-3-methyl-11bH-benzo(a)quinolizine, in which 2-alkoxycarbonylmethylene-1,2,3,4,6,7-hexahydro-9,10-dimethoxy-3-methyl-11bH-benzo(a)quinolizine is reacted with an anhydrous base selected from the class consisting of lower alkoxide and the anion of dimethyl sulfoxide.

8. A method according to claim 5, in which the treatment is carried on in a non-aqueous polar solvent selected from the class consisting of lower alcohol and dimethyl sulfoxide.

9. A method according to claim 8, in which the solvent is lower alcohol and the base is the anion of a low alcohol solvent selected.

10. A method according to claim 8, in which the solvent is dimethyl sulfoxide and the base is the methylsulphinyl carbanion.

References Cited

UNITED STATES PATENTS

| | | | |
|---|---|---|---|
| 2,877,226 | 3/1959 | Brossi et al. | 260—287 |
| 3,045,020 | 7/1962 | Battersby | 260—287 |

OTHER REFERENCES

Brossi et al.: Helv. Chem. Acta, vol. 42, pp. 772–88 (1959), Abstract in Chemical Abstract, vol. 53, col. 20111.

ALEX MAZEL, *Primary Examiner.*

D. G. DAUS, *Assistant Examiner.*